(12) United States Patent
Duval

(10) Patent No.: US 11,546,554 B2
(45) Date of Patent: Jan. 3, 2023

(54) METHOD AND SYSTEM FOR CELLULAR NETWORK-ASSISTED PAY-PER-VIEW

(71) Applicant: c/o NAGRASTAR LLC, Englewood, CO (US)

(72) Inventor: Gregory Duval, Englewood, CO (US)

(73) Assignee: NAGRASTAR LLC, Englewood, CO (US)

( * ) Notice: Subject to any disclaimer, the term of this patent is extended or adjusted under 35 U.S.C. 154(b) by 0 days.

(21) Appl. No.: 17/153,417

(22) Filed: Jan. 20, 2021

(65) Prior Publication Data

US 2022/0232192 A1 Jul. 21, 2022

(51) Int. Cl.
| | | |
|---|---|---|
| *H04N 7/173* | (2011.01) | |
| *H04N 7/16* | (2011.01) | |
| *H04N 21/462* | (2011.01) | |
| *H04N 21/61* | (2011.01) | |

(52) U.S. Cl.
CPC ......... *H04N 7/17318* (2013.01); *H04N 7/163* (2013.01); *H04N 21/4622* (2013.01); *H04N 21/6143* (2013.01)

(58) Field of Classification Search
CPC ............ H04N 21/4126; H04N 21/478; H04N 21/43637; H04N 21/41407; H04N 21/235; H04N 21/632; H04N 21/6334
See application file for complete search history.

(56) References Cited

U.S. PATENT DOCUMENTS

| | | | | |
|---|---|---|---|---|
| 6,968,364 B1* | 11/2005 | Wong | ..................... | H04N 5/765 |
| | | | | 348/E7.071 |
| 9,693,083 B1* | 6/2017 | Yang | ................... | H04N 21/6334 |
| 2002/0007313 A1* | 1/2002 | Mai | ..................... | G06Q 30/0601 |
| | | | | 705/14.13 |
| 2002/0046407 A1* | 4/2002 | Franco | ............... | H04N 21/6543 |
| | | | | 725/110 |
| 2003/0030751 A1* | 2/2003 | Lupulescu | ......... | H04N 21/4622 |
| | | | | 348/552 |
| 2004/0073915 A1* | 4/2004 | Dureau | .................. | H04H 60/46 |
| | | | | 725/9 |
| 2006/0080717 A1* | 4/2006 | Barzilay | ............ | H04N 21/4627 |
| | | | | 725/100 |
| 2008/0080711 A1* | 4/2008 | Gagnon | ........... | H04N 21/26606 |
| | | | | 380/239 |
| 2010/0031281 A1* | 2/2010 | Kim | .................... | H04N 21/2362 |
| | | | | 725/1 |
| 2010/0058401 A1* | 3/2010 | Beyabani | ........... | H04N 21/4542 |
| | | | | 725/93 |

(Continued)

*Primary Examiner* — Jason Salce

(57) ABSTRACT

A method and a system relates to a cellular-network assisted Pay-Per-View (PPV). An issue arises in reconciling PPV purchase balance data when a Set-top Box (STB) lacks a communication link to the PPV headend server. The present disclosure addresses the issue by using a mobile computing device for delivering the PPV balance data from the STB to the PPV headend server over a cellular-network. The mobile computing device receives the PPV balance data from the Conditional Access Module (CAM) on STB through near-field communications. The mobile computing device, when it is moved to inside a service coverage area of a cellular or Wi-Fi-network, transmits the PPV balance data to the PPV headend server. The PPV headend server updates the PPV balance data and transmits the updated PPV balance data to the CAM on STB via the satellite broadcasting network.

20 Claims, 9 Drawing Sheets

(56) References Cited

U.S. PATENT DOCUMENTS

Figure 1:
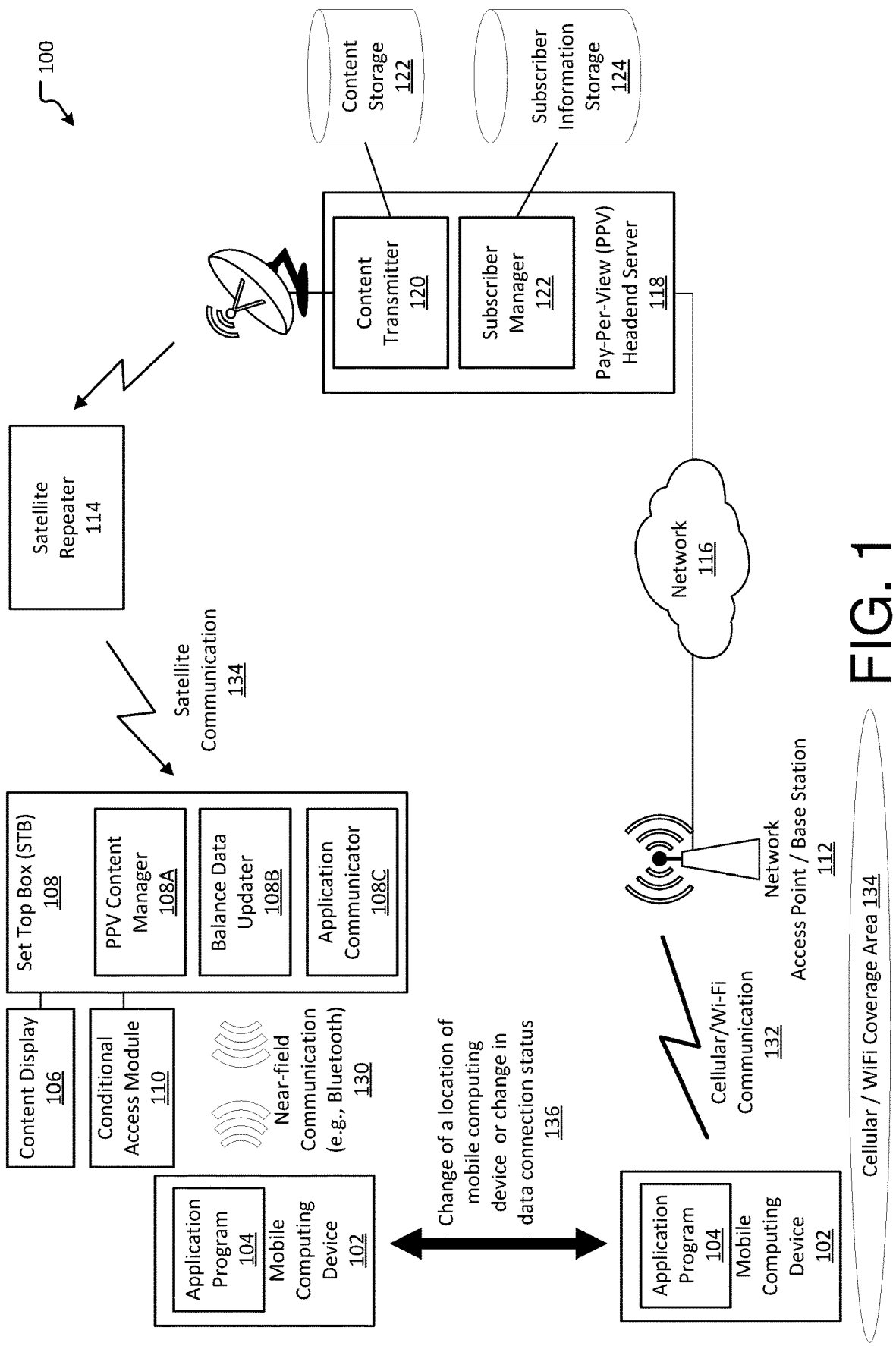

| | | | |
|---|---|---|---|
| 2013/0091514 A1* | 4/2013 | Ishii | H04N 21/44222 |
| | | | 725/5 |
| 2013/0139197 A1* | 5/2013 | Belz | H04N 7/163 |
| | | | 725/25 |
| 2014/0040941 A1* | 2/2014 | Rosenberg | H04N 21/4405 |
| | | | 725/28 |
| 2017/0118500 A1* | 4/2017 | Carroll | H04N 21/26258 |

* cited by examiner

METHOD AND SYSTEM FOR CELLULAR NETWORK-ASSISTED PAY-PER-VIEW

BACKGROUND

Pay-per-view (PPV) has become a popular method for subscribers of media broadcasting to selectively purchase and view content, movies, dramas, and documentaries, for example. PPV requires data communication PPV content may be provided through a variety of communication networks, a satellite network, a radio broadcasting network, a cellular wireless broadband network and a landline communications network, for example. Different types of communication networks provide distinct trade-offs in quality of service in terms of network coverage areas and network speeds in providing the programs. A satellite network, for example, provides a wide network coverage area with broad downlink communication channels for broadcasting data from the headend server to respective set top boxes (STBs) used by subscribers at the subscribers' premises. The satellite network may reach remote locations that are outside the network coverage areas of other types of broadband networks, a fixed line Internet-Protocol (IP) broadband network and the cellular wireless broadband network with the Internet connectivity, for example. STBs in some areas lack an uplink from the STBs to the headend server because the satellite network is for downlink communications only.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by a mobile computing device with program instructions that communicates with an STB via a near field communication (NFC) or other wireless or wired connections with an STB and subsequently communicates with the PPV headend server via a cellular wireless broadband network. The present disclosure eliminates the need to replacing a conditional access module (CAM) on the STB or on a conditional access system (CAS) to selectively receive PPV content and to update balance data. Rather, the mobile computing device enables automatic updates to the balance data on CAM. by receiving the balance data from the CAM that is attached to the STB or to the CAS, transmitting the balance data to the PPV headend server when the mobile computing device is accessible to a wireless network that connects with a broadband IP network. Accordingly, the PPV headend server may transmit an instruction to update the balance on the CAM on the STB via a downlink channel of the satellite communications using a direct broadcast communication, for example. Additionally or alternatively, the mobile computing device may connect to the STB via a near-field communication and update the balance on CAM.

Systems and methods described herein relate to communicating with an STB with a CAM that stores PPV content delivery data and subsequently communicating with a PPV headend server by using a mobile computing device as a bridge to efficiently improve communication between the PPV headend server and the STB to synchronize PPV viewing data and a prepaid balance.

Conventionally, a PPV via satellite communications uses the STB at a subscriber's premise, which communicates with the PPV headend server through a fixed line (i.e., landline, a cable) or a wireless broadband communications network via the Internet. Locations that are served by satellite communications network may reach beyond areas that may be covered by other communications networks, fixed line broadband IP networks and a cellular wireless broadband telecommunication networks ("cellular networks"), for example. Such locations may be houses in remote areas, such as homes in the mountains or other rural areas, for example, where there is no landline or cellular wireless data connectivity to the IP network. A lack of a broadband IP network connection between the STB and the PPV headend server, particularly an uplink connection from the STB and the PPV headend server, raises an issue of securely reconciling balance data (e.g., credit balance) because providing PPV content requires payment or deduction of a balance data, e.g., a credit balance, of the subscriber in order to provide content to STB. Satellite communication network provides an insufficiently limited or no data communication bandwidth in the uplink channels of the satellite communications network between the STB and the PPV headend server.

In contrast, use of a mobile computing device to communicate with the STB to download and store the balance data from the CAM on the STB via a near-field communications (NFC) on the mobile computing device and upload the balance data once the mobile computing device moves to a location where the mobile computing device communicates with the PPV headend server via a WiFi network (e.g., IEEE 802.11 standards), a cellular network (e.g., The Global System for Mobile Communication (GSM), Code-division Multiple Access (CDMA), Universal Mobile Telecommunications Service (UMTS/3G), the 4G Long Term Evolution (LTE), and the 5G cellular telecommunication networks). The system and methods described herein address the issue of reconciling PPV balance data between the STB and the PPV headend server when the connection network connection between the two are insufficient.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system of a cellular network-assisted Pay-Per-View (PPV) in accordance to aspects of the present disclosure.

Figure 2A:
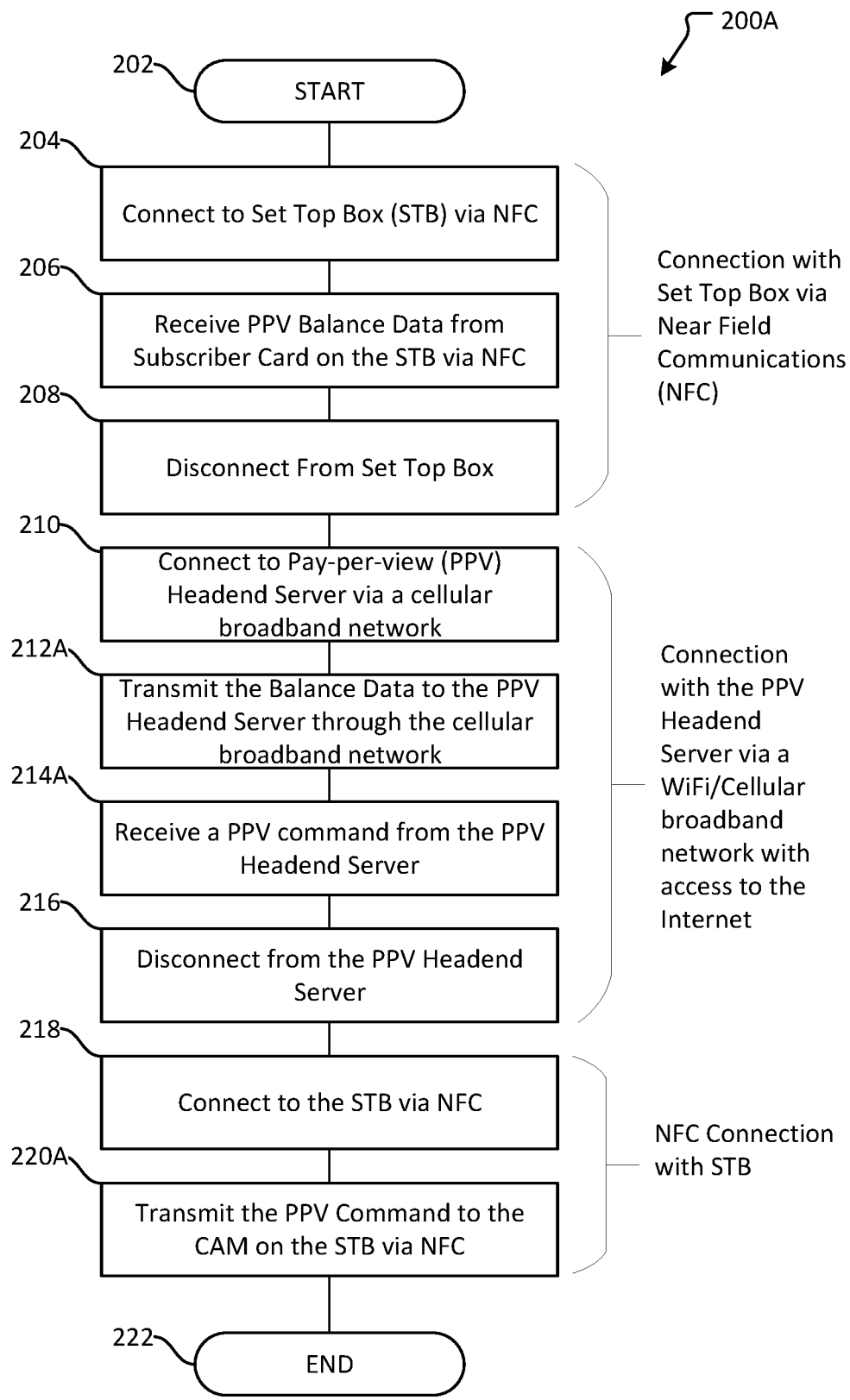
Figure 2B:
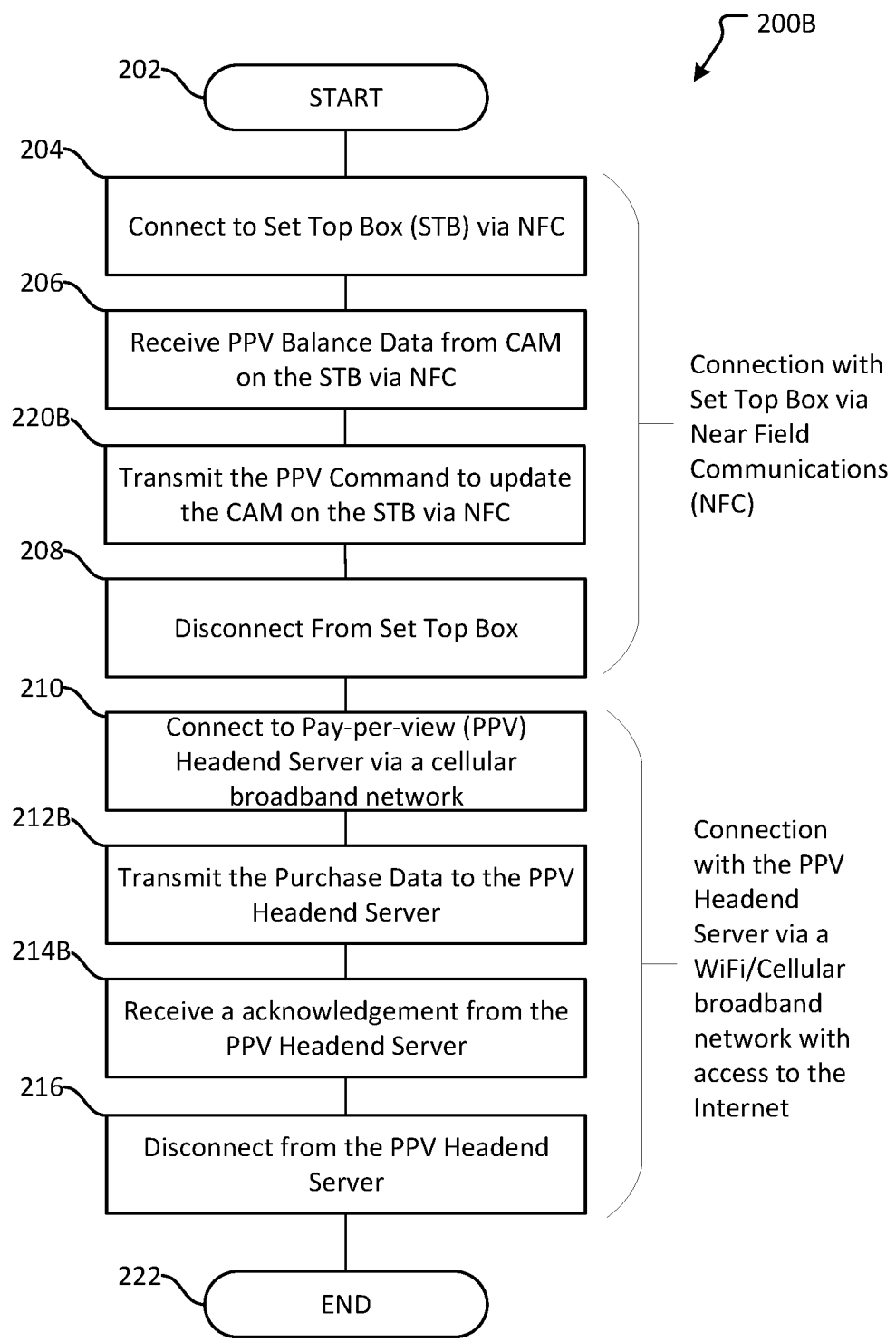

FIGS. 2A-B illustrate example methods of updating balance data in an example system of a cellular network-assisted Pay-Per-View (PPV) with which the disclosure may be practiced in accordance with aspects of the present disclosure.

Figure 3A:
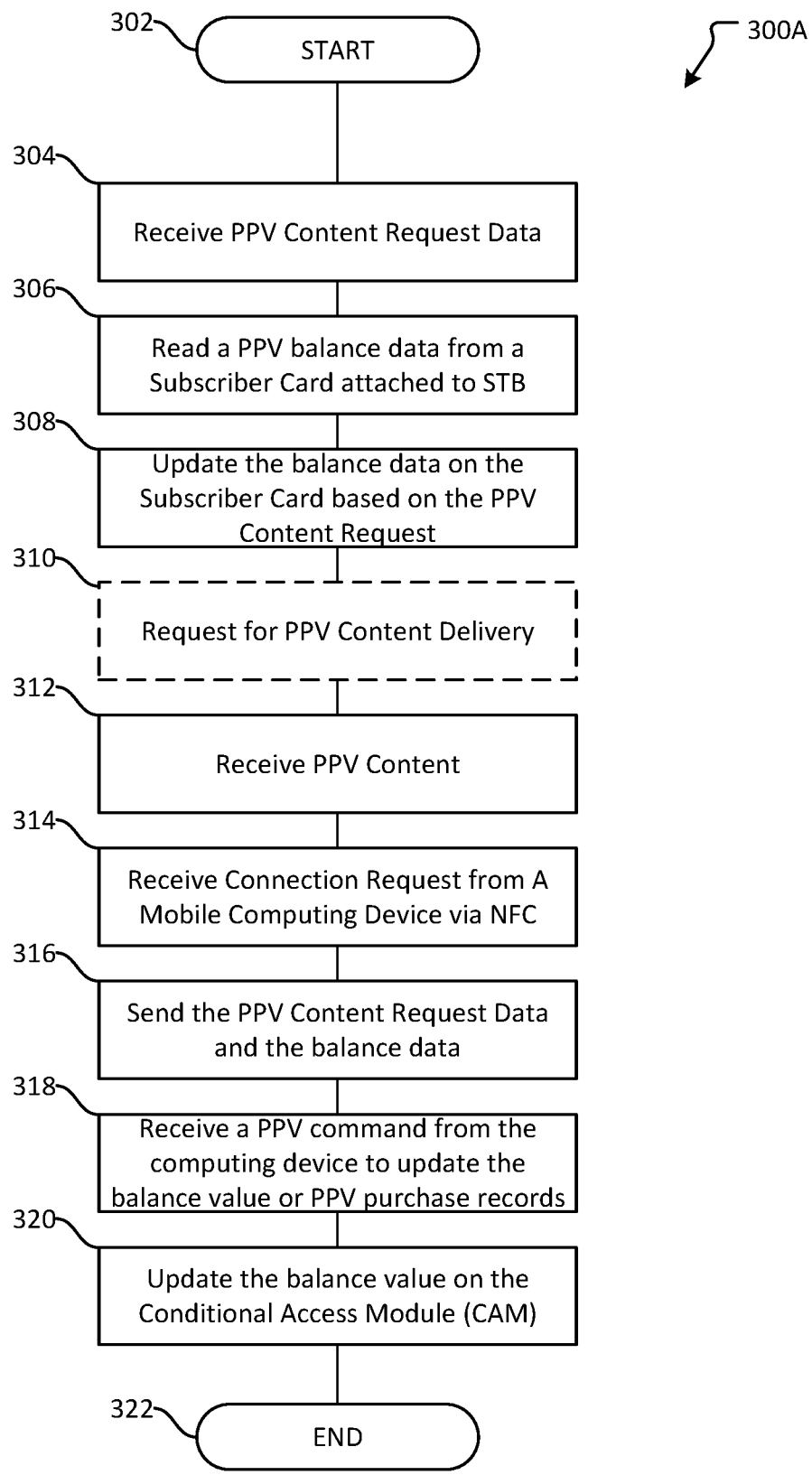
Figure 3B:
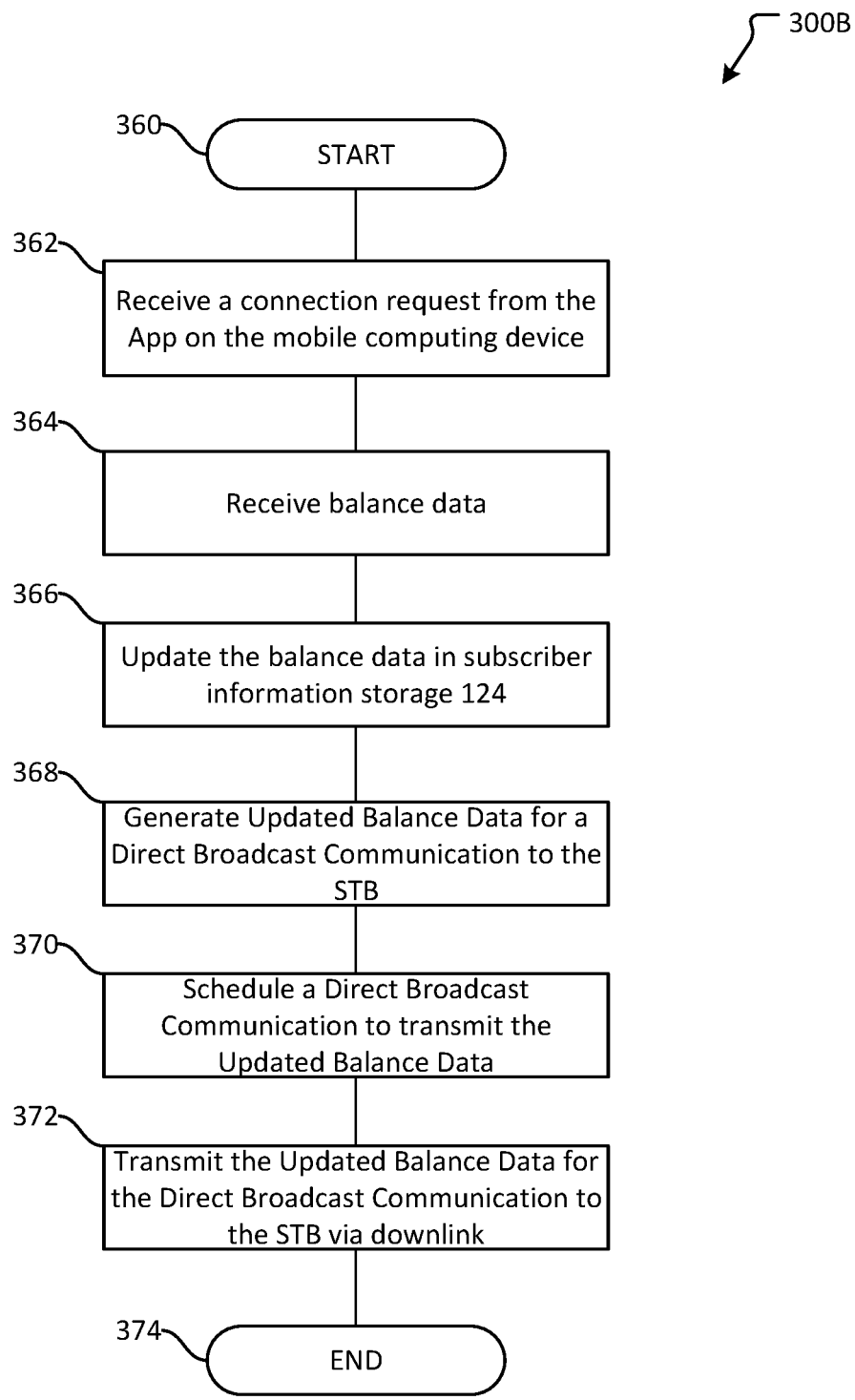

FIGS. 3A-B illustrate example methods of updating balance data according to an example system of a cellular network-assisted Pay-Per-View (PPV) with which the disclosure may be practiced in accordance with aspects of the present disclosure.

Figure 4A:
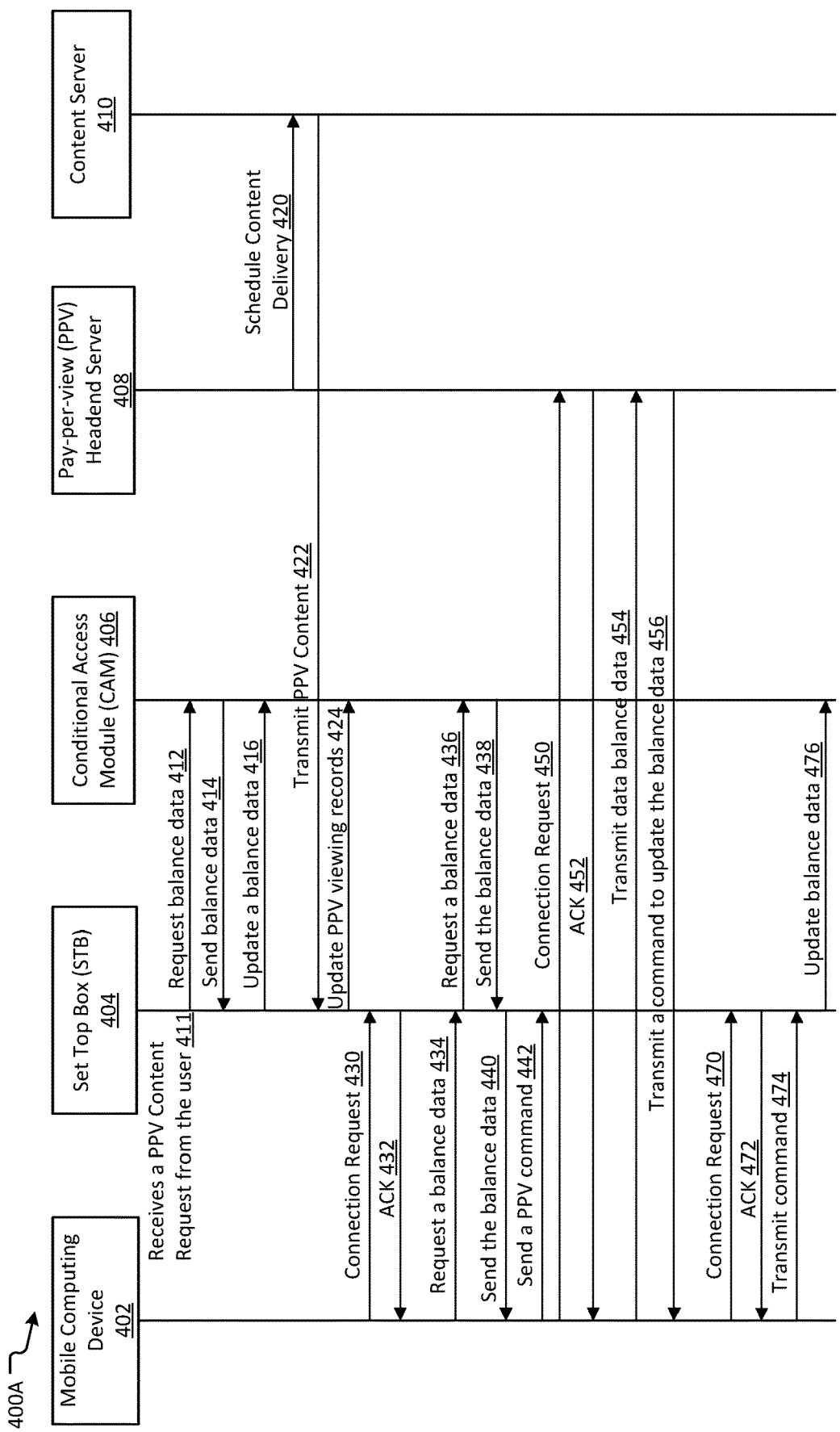
Figure 4B:
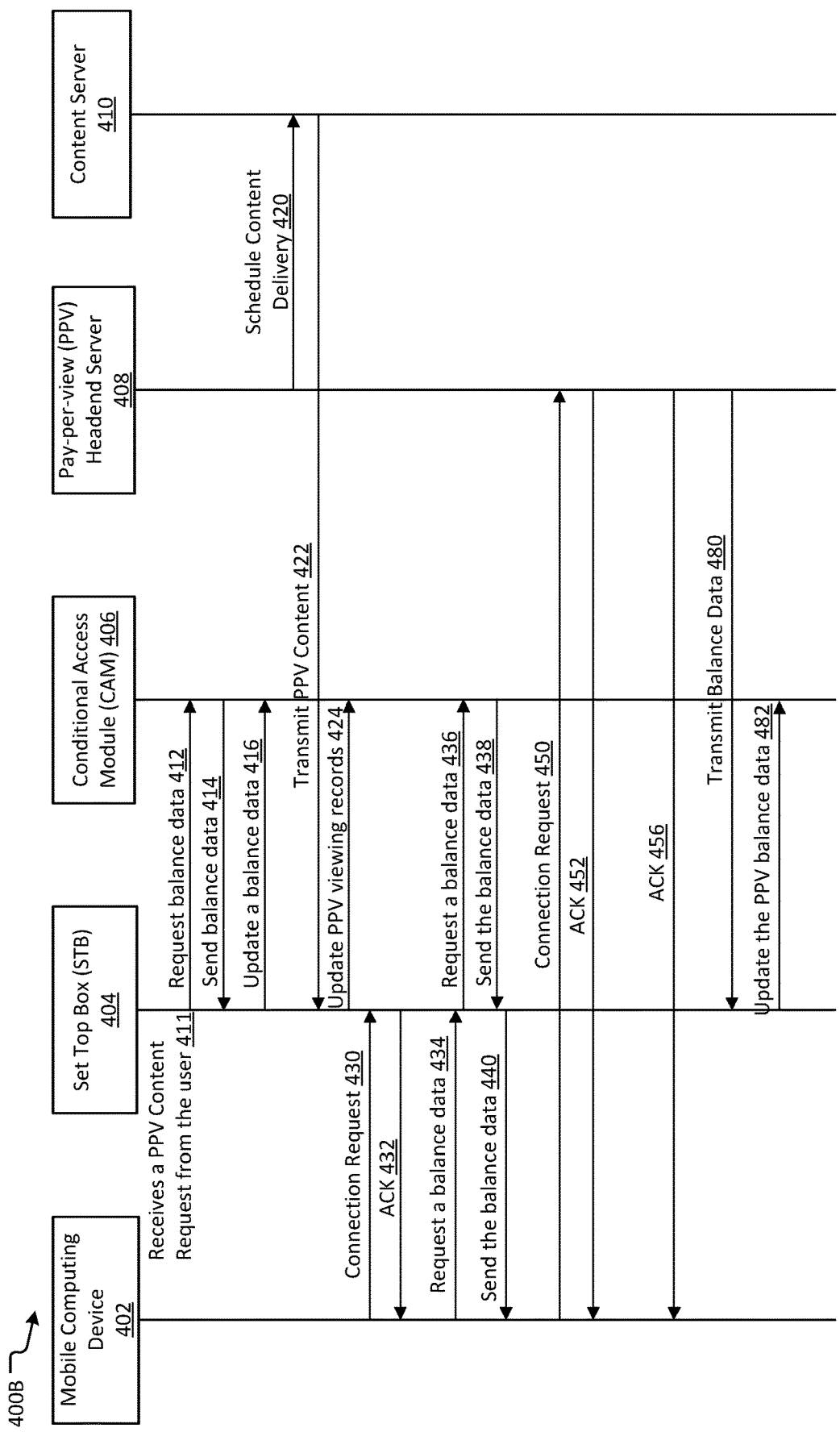

FIGS. 4A-B illustrate example sequence of data communications for updating balance data according to an example system of a cellular network-assisted Pay-Per-View (PPV) with which the disclosure may be practiced in accordance with aspects of the present disclosure.

Figure 5A:
Figure 5B:
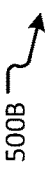
Figure 5C:

FIGS. 5A-C illustrate examples of PPV balance data and commands according to an example system with which the disclosure may be practiced in accordance with aspects of the present disclosure.

Figure 6:
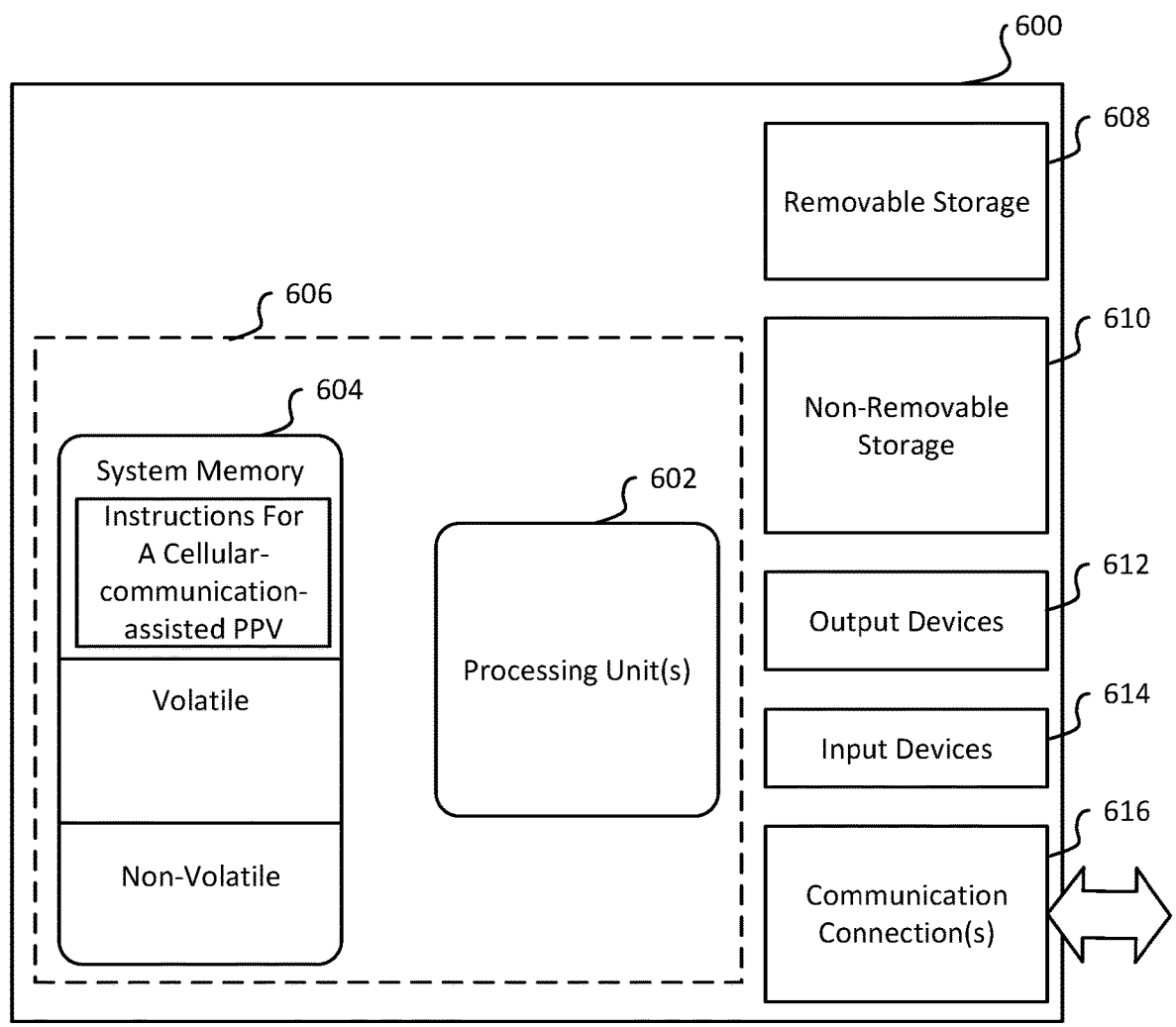

FIG. 6 is a block diagram illustrating example physical components of a computing device with which aspects of the disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for a cellular-network assisted Pay-Per-View (PPV). In aspects, a PPV service is a content streaming (e.g., a video, a movie, a TV program, and other multi-media content) service. Customers may subscribe to a content streaming service based on a fixed subscription fee over a period of time, monthly fees and annual fees, for example. In contrast, customers may pay for each content. A PPV service, the customers pay per content for viewing.

PPV services may use satellite-based communications to transmit content to subscribers. In satellite communications, data communications take place by a PPV headend server transmitting PPV content to subscribers via a satellite at predetermined radio frequencies to set-top boxes (STBs) at customers' premises. Advantages of using satellite-based communications include a wide service coverage area (or a network coverage area) and a wide network bandwidth (i.e., a number of bits per second) for the downlink channels from the satellite to the STBs. Issues of using the satellite-based communication may arise when uplink communication is needed from the STBs to the satellite. The bandwidth on uplink channels is unusable or insufficiently narrow for the uplink communications. Further, PPV services may only use the download channels to broadcast programs.

In aspects, PPV services enable customers to browse a catalog of PPV content, select a content from the catalog, and pay for the content. While the downlink network bandwidth for the satellite communications may be sufficient to provide the user interactive catalogs of content, the network bandwidth of the uplink channels may be unusable or impractical in cost and bandwidth for the STBs at the customers' premises to securely transmit accounting records to the PPV headend server. Thus, the STBs may utilize other communication channels without using the uplink channel of the satellite communications to transmit accounting data to the PPV headend server and to update the data on the STBs receive the PPV content. In some aspects, downlink communications on the satellite communications may include a direct broadcast communication.

In some aspects, the STBs may connect to the PPV headend server through the Internet using a landline data network, the Multiprotocol Label Switching (MPLS), Integrated Services Digital Network (ISDN), or a dial-up telephone network. Alternatively, the STBs may connect to a hotspot of a local WiFi-network that connects with the landline data or a cellular network (e.g., 5G). The STB may connect directly to the 5G cellular network by attaching a network adapter to the STB when the 5G cellular network is available at a location where the STB is located.

The uplink connectivity issue arises when an STB is placed at a location without any connectivity to the Internet via the fixed line or via WiFi that connects with the fixed line or via a cellular communication network. The uplink connectivity issues may arise in rural or remote areas, for example. Such locations may be outside a service area of landline telephone service networks and outside a coverage area of cellular networks. However, customers of PPV may still demand a PPV service at such remote locations. In particular, there is a need to enable providing a PPV service where the PPV services broadcast PPV content to the STBs through the downlink channels of the satellite communications in situations where the STB cannot communicate with a content provider. In order to access PPV content, a STB must be able to facilitate PPV transactions with the user. Accordingly, the STBs needs to communicate with the PPV headend server to reconcile the transaction using a network communication channel.

As detailed herein, the application discloses a method of cellular-network assisted Pay-Per-View. The disclosure provides an uplink communication path from the STB to the PPV headend server when the STB lacks direct connectivity to the PPV headend server through the Internet.

FIG. 1 illustrates an overview of an example system of a cellular-network assisted Pay-Per-View (PPV) in accordance to aspects of the present disclosure. System 100 may represent a system for updating balance data based on the mobile computing device communicating with the set top box and the PPV headend server.

A mobile computing device 102 is a movable device that communicates with a plurality of data communication networks. In aspects, the plurality of data communication networks may include a Near-field Communication or NFC 130 and a cellular/Wi-Fi communication network 132, a landline broadband IP networks, for example. The NFC may be a Bluetooth®, Zigbee®, and RFID communications, for example. The cellular network may be 3G/4G/5G wireless networks, for example. The wireless IP network may be an IEEE 802.11-compliant WiFi network that connects to the Internet, for example. The landline (i.e. fixed line) broadband IP networks may be a local area network (LAN), multiprotocol label switching (MPLS), and a wide-area network (WAN), for example. The mobile computing device 102 may comprise an application program 104 that instructs processing data on the mobile computing device 102. FIG. 1 contains two mobile computing devices with both labeled as 102 to illustrate a same mobile computing device 102 at two different locations or situations where the mobile computing device 102 connects to a set top box or STB 108 via a near-field communication NFC 130 or the like at one location and the same mobile computing device 102 connects to Pay-Per-View (PPV) headend server 128 via a cellular/Wi-Fi communication 132 (e.g., a cellular network) and the landline network (i.e., the Internet) 116 at a different location. The connections to one or more of the plurality of the networks may be based on movement of the mobile computing device 102 or a change in data connection status 136 to the networks. In examples, the mobile computing device 102 may not be able to connect to both the STB 108 and the PPV headend server 128 at the same location due to network limitations.

In aspects, the mobile computing device 102 is accessible to the cellular/Wi-Fi communication 132 to a network access points/base station 112 when the mobile computing device 102 is within the cellular/Wi-Fi service coverage area 134. In some aspects, the mobile computing device 102 is outside the cellular/Wi-Fi service coverage area 134 when the mobile computing device 102 communicates with the STB 108 using the NFC 130. The STB 108 is located in a log house that is remotely located within a mountain where the log house is outside a cellular network's service coverage area, for example.

The application program 104 is installed on the mobile computing device 102. The application program 104 includes programming instructions to communicate with the STB 108 and the CAM 110 (e.g., a subscriber card or a smart card), which is attached to the STB 108 using the NFC 130. The programming instructions also communicate with the PPV headend server 128 using the cellular/Wi-Fi communication 132 through a network access point/base station 112 and the network 116. In aspects, the application program 104 uses a memory on the mobile computing device 102 to store data and commands that the application program 104 receives.

The STB 108 provides PPV content to a PPV subscriber. In some aspects, the STB 108 connects with a content display 106, a television or a monitor display, for example, for user viewing PPV content. In aspects, the STB 108 connects with a satellite repeater 114 using a satellite communication 134 through a satellite dish (not shown). The STB 108 connects with a CAM 110 using a smart card reader drive where the CAM 110 is inserted, for example (not shown). The CAM 110 stores data that identifies a subscriber who request and views the PPV content and PPV balance data that depict PPV content request history and allowance of receiving the PPV content. The STB 108 may comprise a PPV content manager 108A, a balance data updater 108B, and an application communicator 108C. The PPV content manager may receive a predefined PPV content program schedule from the PPV headend server through the downlink channel of the satellite communications. In aspects, the PPV headend server may broadcast the predefined PPV content program schedule periodically. The PPV content manager may interactively provide the received PPV content program schedule to the user using the content display 106. Users may interactively place a request for the PPV content. The PPV content manager manages receipt of a PPV content request from the user and facilitates access to PPV content from the PPV headend server 128. The PPV content manager may store the delivered PPV content on a data storage device on the STB 108, and provide for the display of the PPV content using the content display 106. The STB 108 may further be operable to record PPV viewing history and balance data on the CAM 110 based on the PPV content request and the PPV content delivery. In some aspects, the STB 108 may reject the PPV content request from the user when a remaining balance is insufficient to view the PPV content.

The application communicator 108C of the STB 108 communicates with the application program 104 on the mobile computing device 102. In aspects, the STB 108 receives a connection request from the mobile computing device 102 using the NFC 130. The connection between the mobile computing device 102 and the STB 108 may be based on Bluetooth®, for example. In some aspects, the application communicator 108C receives a request for PPV balance data from the application program 104 on the mobile computing device 102, reads the PPV balance data from the CAM 110 that is attached to the STB 108, transmits the PPV balance data to the application program 104 on the mobile computing device 102 using the NFC 130.

The CAM 110 may be a smart card that stores information about the subscriber or a user who subscribes to the PPV and balance data that relate to using the PPV. In aspects, the CAM 110 is inserted into a smart card reader that attaches to the STB 108. The STB 108 uses the CAM 110 to determine the subscriber, reads one or more balance data that depict the subscriber's PPV usage history and a remaining balance value to apply upon receiving a request by the subscriber for PPV content delivery to the STB 108. The CAM 110 in CAS controls content that STB receives from the PPV headend server 118 via a broadcast of satellite communications 134 by conditionally accessing data that are allowed for the PPV subscriber. In some aspects, the balance data updater 108B of the STB 108 updates the one or more balance data on the CAM 110 based on PPV usage by the subscriber. The PPV headend server 118 may transmit the balance data that are specific to the CAM via direct broadcasting communications. The CAM may identify and selectively receive the satellite communications that are specific to the PPV subscriber, for example.

A satellite repeater 114 repeats and relays data communications 134 between the STB 108 and the PPV Headend server 118. In aspects, the satellite repeater 114 is a satellite unit in space, orbiting around the Earth.

The PPV headend server 118 controls a PPV program to the subscriber. In aspects, the PPV headend server communicates with the STB 108 using the satellite communication 134. The PPV headend server may also communicate with the mobile computing device 102 through the network 116 using the Internet. The mobile computing device 102 may uses the cellular/Wi-Fi communication 132 through the network access point/base station 112 to the network 116. The PPV headend server 118 comprises a subscriber manager 122 and a content transmitter 120. The subscriber manager 122 manages subscribers of the PPV program stores subscriber information in a subscriber information storage 124, which is attached to the PPV headend server 18. The content transmitter 120 transmits PPV content that is stored in the content storage 122 to the STB 108 by communicating with the PPV content manager of the STB 108.

In aspects, the PPV headend server 118 broadcasts content of the PPV program via a downlink of the satellite communications 134 without receiving uplink communications from the STB 108 for requesting and/or acknowledging receipt of the PPV content. Content transmitter 120 of the PPV headend server 118 transmits content of the PPV program at predetermined dates and times according to the predefined PPV content program schedule. The PPV headend server broadcasts the PPV content without processing sales transactions for the PPV content at the PPV headend server at the time of the broadcasting. The STBs processes the sales transactions of the PPV content, for example, based on the remaining credit balance stored on the CAM 110.

In certain scenarios, the STB 108 may not be able to connect to the PPV headend server 118, for example, when the STB 108 does not have an uplink network connection. Under such circumstances, the STB 108 may rely upon a mobile computing device, such as a smartphone, to communicate with the PPV headend server 118 on behalf of the STB. In aspects, the PPV headend server 118 receives a connection request from the mobile computing device. The PPV headend server 118 may receive a list of PPV balance data for the subscriber from the application program 104 on the mobile computing device 102. Based on the received PPV balance data, the subscriber manager 122 updates and reconciles payment and usage records. Upon updating payment and usage records, the subscriber manager 122 may process the request to access PPV content transmitted by the mobile computing device 102 on behalf of the STB 108. If the request to access the PPV content is granted, the mobile computing device 108 may receive permission to access the requested PPV content. The permission may be in the form of a key or other type of data that can be used by the CAM 110 of STB 108 to provide access to the PPV content. Upon moving back into a proximity to communicate with the STB 108, the mobile computing device 102 transmits the permission to STB 108, thereby permitting access to the PPV content.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

FIG. 2A illustrates an example method of a cellular-assisted PPV in accordance with aspects of the present disclosure. A general order of the operations for the method 200A is shown in FIG. 2A. Generally, the method 200 starts with a start operation 202 and ends at an end operation 222. The method 200 may include more or fewer steps or may arrange the order of the steps differently than those shown in FIG. 2A. The method 200A can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 2B, 3A-B, 4A-B, 5A-C, and 6. In aspects, the method 200 may executed by a mobile computing device 102 used by the subscriber of the PPV, where the CAM 110 that stores information about subscriber is attached to the STB 108.

Connect operation 204 connects a mobile computing device to the set top box or STB via NFC, using Bluetooth® for example. In aspects, the mobile computing device includes an application program that specifies which STB the mobile computing device connects to. In some aspects, the mobile computing device and the STB communicates encrypted data over NFC for secure data transmission.

Receiving operation 206 receives a PPV balance data from the CAM on the STB via NFC. In some other aspects, the application program specifies which CAM to request for PPV balance data based on an identifier of the CAM.

Disconnect operation 208 disconnects the connection via NFC between the mobile computing device and the STB after the mobile computing device receiving the PPV balance data. In aspects, the mobile computing device may initiate the disconnect operation. In some other aspects, the STB may initiate the disconnect operation after the STB successfully transmitting the PPV balance data. In some other aspects, the disconnect operation 208 occurs upon timeout, after a predetermined time elapses after the receiving operation 206 completes.

Connect operation 210 connects the mobile computing device with a PPV headend server using a cellular broadband network (e.g., The Global System for Mobile Communication (GSM), Code-division Multiple Access (CDMA), Universal Mobile Telecommunications Service (UMTS/3G), the 4G Long Term Evolution (LTE), and the 5G cellular telecommunication networks). Additionally or alternatively, the mobile computing device may use a Wi-Fi network that connects with the Internet via a fixed line and/or the cellular broadband network. In aspects, the mobile computing device is within a radio coverage area of the cellular broadband network when the mobile computing device connects to the PPV headend server. In some other aspects, the mobile computing device may connect to the Internet via a fixed line communications network by attaching two ends of a cable, a Universal Serial Bus (USB) cable for example, to the mobile computing device and the Internet access point. In some other aspects, a user of the mobile computing device moves the mobile computing device from a premise with an NFC connection with STB but without access to the cellular broadband network or the Wi-Fi network.

Transmit operation 212A transmits the PPV balance data from the mobile computing device to the PPV headend server. In aspects, the transmit operation 202 may transmit the PPV balance data through the cellular broadband network and the Internet. The PPV balance data may be encrypted by the mobile computing device for attaining security in data transmission. In some aspects, transmit operation 212A transmits a purchase information (the PPV purchase data) from the mobile computing device to the PPV headend server. The PPV purchase data may include date and time information when PPV content was purchased, an identifier of the PPV content (or an asset ID/a program ID), an identifier of the subscribing customer, and an identifier of the STB that provided the PPV content for viewing.

Receive operation 214A receives a PPV command from the PPV headend server through the cellular broadband network or the Wi-Fi network. In aspects, the PPV command is a command for the STB to execute to reset the PPV balance data, for example. The PPV command may indicate that the PPV balance data on the CAM and the data on the PPV headend server are coordinated. In some aspects, the PPV command may instruct the STB to store an event information. The event information may indicate that the PPV headend server has received the PPV content purchase data from the PPV app on the mobile computing device.

In aspects, the steps between the connect operation 210 through the receive operation 214 takes place while the mobile computing device is within the service coverage area of the cellular broadband network or a Wi-Fi hotspot with connection to the Internet. The user of the mobile computing device may move away from the location of the STB that is outside the service coverage. The communications with the PPV headend server may take place when the user with the mobile computing device may be at a location inside the service coverage area, in a town, for example.

Disconnect 216 operation disconnects the mobile computing device from the PPV headend server. In aspects, the disconnect 216 operation may occur when the mobile computing device moves to a location that is outside the service coverage area of the cellular broadband network or the Wi-Fi hotspot. The user of the mobile computing device returns to a location of the STB, for example.

Connect operation 218 connects the mobile computing device to the STB via NFC. The connect operation 218 occurs when the mobile computing device is inside the radio coverage area of the NFC, in proximity of the STB, for example. The mobile computing device may automatically connect to the STB when the mobile computing device detects a presence of the STB for the NFC connection.

Transmit operation 220A transmits the PPV command stored in the mobile computing device to the CAM on the STB via NFC. In aspects, the CAM is inserted to the STB. STB may receive the PPV command from the mobile computing device and route to the CAM that is attached to the STB. Upon receiving the PPV command, the CAM may execute the PPV command. The PPV command may reset the PPV balance data, for example.

As should be appreciated, operations 202-222 in FIG. 2A are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 2B illustrates an example method of a cellular-assisted PPV in accordance with aspects of the present disclosure. A general order of the operations for the method 200B is shown in FIG. 2B. Generally, the method 200B starts with a start operation 202 and ends at an end operation 222. The method 200B may include more or fewer steps or may arrange the order of the steps differently than those shown in FIG. 2B. The method 200B can be executed as a set of computer-executable instructions executed by a computer system and encoded or stored on a computer readable medium. Further, the method 200A can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 2A, 3, 4, 5A-C, and 6. In aspects, the method 200 may executed by a mobile computing device 102 used by the subscriber of the PPV, where the CAM 110 that stores information about subscriber is attached to the STB 108.

In the method 200A of FIG. 2A, the mobile computing device 102 transmits the PPV command to the STB after the communication with the PPV headend server takes place. In contrast, in the method 200B of FIG. 2B, the transmit operation 220B takes place after the receive operation 206 and before the connect operation 210 of the mobile computing device 102 connecting with the PPV headend server.

In particular, transmit operation 220B in FIG. 2B transmits, by the mobile computing device, a PPV command to the CAM on the STB via NFC. In contrast to the transmission operation 220A in FIG. 2A, the transmission operation 220B takes place before the connect operation 210 by the mobile computing device with the PPV headend server using the cellular network or the Wi-Fi network that connect with the Internet. The PPV command may include one or more of resetting the PPV balance data, deleting the PPV purchase data, storing a status record that the mobile computing device has downloaded the PPV balance data from the STB. Upon receiving the PPV command, the CAM on the STB may execute the PPV command. This way, the PPV credit balance on STB may be reset to enable subsequent viewing, for example, before the user takes the mobile computing device to the town for the mobile computing device to communicate with the PPV headend server via a cellular telecommunication network.

The method 200B in FIG. 2B includes transmit operation 212B that transmits, by the mobile computing device, the PPV purchase data of the PPV content to the PPV headend server. The PPV purchase data may include date and time information when a PPV content was purchased, an identifier of the PPV content (or an asset ID/a program ID), an identifier of the subscribing customer (e.g., an identifier of the CAM), and an identifier of the STB that provided the PPV content for viewing. In contrast to the method 200A in FIG. 2A, the method 200B in FIG. 2B illustrates aspects does not require the mobile computing device to reconnect to the STB to update the balance data based on the communication between the mobile computing device and the PPV headend server. Alternatively, the PPV headend server transmits, using the downlink channel of the satellite communications, the updated balance data to the STB. The STB receives the updated balance from the satellite using, the direct broadcast communication, for example.

Receive operation 214B receives an acknowledgement data of receiving the PPV purchase data from the PPV headend server. In aspects, there is no need for the mobile computing device to re-connect with the STB to transmit the acknowledgment data because the STB has already updated its records based on the transmit operation 220B.

As should be appreciated, operations 202-222 in FIG. 2B are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 3A illustrates an example method of providing a cellular-communication-assisted PPV in accordance with aspects of the present disclosure. A general order of the operations for the method 300A is shown in FIG. 3A. Generally, the method 300A starts with a start operation 302 and ends with an end operation 322. The method 300 may include more or fewer steps or may arrange ordering of the steps differently than those shown in FIG. 3. The method 300A is directed to providing a cellular-communication-assisted PPV service to an STB. The method 300A can be executed as a set of computer-executable instructions executed by a computer system and encoded or stored on a computer readable medium. Further, the method 300A can be performed by gates or circuits associated with a processor, an ASIC, an FPGA, a SOC, or other hardware device. Hereinafter, the method 300A shall be explained with reference to the systems, component, devices, modules, software, data structures, data characteristic representations, signaling diagrams, methods, etc., described in conjunction with FIGS. 1, 2A-B, 3B, 4A-B, 5A-C, 6.

Receive operation 304 receives PPV content request data. In aspects, a customer of the PPV service uses a STB to browse PPV content that are available for view. Through interactive operation of the STB, the user selects a PPV content (e.g., a movie) to view. The interactive operations for browsing and for selecting the PPV content may be provided through a display monitor that is attached to the STB. In aspects, the STB may have received information about PPV content from the PPV headend server through the downlink channels of the satellite communications.

Read operation 306 reads a PPV balance data from a CAM. The CAM may be inserted to a card reader on the STB, for example. The CAM stores information about the PPV customer and PPV balance data to purchase PPV content.

Update operation 308 updates the PPV balance data stored on the CAM based on the PPV content request. In aspects, the STB updates the PPV balance data by deducting the PPV balance data by a price of the PPV content being requested. The price may be US$5, for example. Accordingly the STB either deducts the PPV balance data by US$5 or debits US$5 against the PPV balance data. In some aspects, the CAM stores the PPV balance data with a maximum amount. The maximum amount may be set based on an amount prepaid by the customer prior to selecting the PPV content for purchase. In some other aspects, the CAM may maintain a maximum amount for purchasing PPV content for reconciliation at a later time. When the maximum amount is set at US $100, the customer may view 20 PPV content with each priced at US $5, for example.

Request operation 310 is optional. In aspects, request operation 310 may be absent in case of the PPV headend server broadcasting and delivering the PPV content at pre-scheduled dates and times without receiving uplink communications from the STB. Additionally or alternatively, when the STB has uplink connectivity to the PPV headend server, request operation 310 requests for PPV content delivery. In aspects, the STB transmits a request for a delivery of the PPV content as requested by the customer. The STB may transmit the request over the uplink channels of the satellite communications to the PPV headend server. In some aspects, the STB may transmit a request that include more than one PPV content for delivery at specific times. Some PPV content may be streamed from the PPV headend server for immediate displaying. Some other PPV content may be delivered and locally stored in the STB for a later showing.

Receive operation 312 receives the PPV content from the PPV headend server in response to the request for the PPV content delivery. In case of the PPV headend server broadcasting the PPV content based on a predetermined PPV content program schedule without requiring a request for PPV content delivery from the STB, the STB receives the broadcast data from the downlink channels of the satellite communications at the scheduled date and time. In aspects, the STB may display the PPV content on the display device attached to the STB as the STB receives the streaming from the PPV headend server. In some other aspects, the STB may store the PPV content locally for later showing.

Receive operation 314 receives a connection request from a mobile computing device at the STB via NFC. In aspects, the mobile computing device is in proximity to the STB. The mobile computing device may include an application program for the PPV balance reconciliation with the PPV headend server. The mobile communication device may be located outside the service coverage area for a cellular/WiFi communications network and disconnected from the Internet. That is, the mobile communication device may be disconnected from the PPV headend server when the STB receives the connection request from the mobile communication device.

Send operation 316 transmits by the STB the PPV balance data via NFC to the mobile computing device. In aspects, the STB may read the PPV balance data from the CAM and transmit the data to the mobile computing device. In aspects, the STB may record which data the STB has transmitted to the mobile computing data as a checkpoint information. The STB may then store the checkpoint information on the CAM. This way, the CAM may keep track of the PPV balance data that have been copied to the mobile computing device. In aspects, the mobile computing device may, upon receiving the PPV balance data from the STB, transmit a PPV command to update or reset the PPV balance on the STB. In some other aspects, the mobile computing device may transmit the PPV command to update or reset the PPV balance on the STB after communicating with the PPV headend server. In aspects, the mobile computing device may be transported from the location of PPV (outside the service coverage area) to a location inside a service coverage area of a cellular telecommunications network. The mobile communication device may then transmit the PPV balance data to the PPV headend server over the cellular/Wi-Fi communications network through the Internet. The PPV headend server may reconcile the PPV customer data based on the data received from the mobile computing device. The PPV headend server may then transmit a PPV command to the mobile computing device. The PPV command is for execution on the STB.

Receive operation 318 receives a PPV command from the mobile computing device. The PPV command may be an update command to reset the PPV balance on the CAM, for example. In aspects, the receive operation 318 receives the PPV command from the mobile computing device before the mobile computing device communicates with the PPV headend server to update the subscription balance. In some other aspects, the mobile computing device may receive the PPV command from the PPV headend server after transmitting the PPV balance data. The mobile computing device may in turn transmits the PPV command to the STB.

Update operation 320 updates the PPV balance data by updating the balance or resetting the balance on the CAM. In aspects, the update operation 318 is based on the PPV command received from the mobile computing device. By updating the PPV balance data on the CAM, the PPV balance data becomes synchronized between the CAM on the STB and the PPV headend server. In some aspects, the STB may continue to accept requests for PPV content for viewing. The STB changes the PPV balance data while also noting the checkpoint information to be able to identify which PPV balance data entries have been transmitted to the mobile computing device for reconciliation.

As should be appreciated, operations 302-322 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 3B illustrates an example method of the headend server updating the balance data on a subscriber and updating a balance update to a CAM on a STB. A general order of the operations for the method 300B is shown in FIG. 3B. Generally, the method 300B starts with a start operation 360 and ends with an end operation 374. The method 300B may include more or fewer steps or may arrange ordering of the steps differently than those shown in FIG. 3. The method 300B is directed to providing a cellular-communication-assisted PPV service to an STB. The method 300B can be executed as a set of computer-executable instructions executed by a computer system and encoded or stored on a computer readable medium. Further, the method 300B can be performed by gates or circuits associated with a processor, an ASIC, an FPGA, a SOC, or other hardware device. Hereinafter, the method 300B shall be explained with reference to the systems, component, devices, modules, software, data structures, data characteristic representations, signaling diagrams, methods, etc., described in conjunction with FIGS. 1, 2, 3A, 4A-B, 5A-C, and 6.

Receive operation 362 receives a connection request from the App on the mobile computing device. The connection request may be received via the Internet and data transmission segments may include a cellular telecommunication network when the mobile computing device connects to the cellular telecommunication network. Additionally or alternatively, the connection request may be received from a Wi-Fi wireless network that connects with the Internet. The mobile computing device may connect with a Wi-Fi network that intern connects with the Internet.

Receive operation 364 receives balance data from the mobile computing device. In aspects, the balance data may be the PPV balance data on the CAM on the STB. The mobile computing device may download the PPV balance data from the STB via NFC as illustrated in the receive operation 206 in FIG. 2B, for example.

Update operation 366 updates the PPV balance data in the subscriber information storage 124. In aspects, the PPV headend server 118 updates and reconciles the PPV balance data for the CAM based on the PPV balance data received and records of PPV content transmission through the satellite communication network.

Generate operation 368 generates the updated PPV balance data for transmission via the direct broadcast communication to the STB. In aspects, the satellite communications are capable of transmitting data that are specific targeted to a particular CAM in a STB through the downlink channels of the broadcast communications. The STB with the specified CAM may selectively receive the data from the PPV headend server.

Schedule operation 370 schedules a direct broadcast communication to transmit the updated PPV balance data. In aspects, the transmission of the updated PPV balance data to the CAM in the STB may be immediately after the PPV headend server updates the PPV balance data in the subscriber information storage 124 after receiving the PPV balance data from the mobile computing device. In some aspects, the PPV headend server may transmit the updated PPV balance data to the CAM in the STB at determined times, twice a day, for example.

Transmit operation 372 transmits the updated PPV balance data via the satellite communications. In aspects, the updated PPV balance data may be transmitted using the downlink channels of the direct broadcast communication to the STB, for example. In aspects, the STB may receive the updated PPV balance data and updates the PPV balance data. This way, the PPV balance data on the CAM on the STB may be updated without the mobile computing device reconnecting with STB via NFC after the mobile computing device uploading the PPV balance data to the PPV headend server via a cellular telecommunications network.

As should be appreciated, operations 360-374 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 4A illustrates an example method of a cellular-communication-assisted PPV in accordance with aspects of the present disclosure. A general sequence of operations of the method 400A is shown in FIG. 4A. Generally, the method 400A starts with a receive operation 411 and ends with an update operation 476. The method 400A may include more or fewer steps or may arrange the order of the steps differently than those shown in FIG. 4. The method 400A can be executed as a set of computer-executable instructions executed by a computer system and encoded or stored on a computer readable medium. Further, the method 400A can be performed by gates or circuits associated with a processor, an ASIC, an FPGA, a SOC or other hardware device. Hereinafter, the method 400A shall be explained with reference to the systems, component, devices, modules, software, data structures, data characteristic representations, signaling diagrams, methods, etc. described in conjunction with FIGS. 1, 2, 3A-B, 4B, 5A-C, and 6.

FIG. 4A is a timing chart of communications among a mobile computing device 402, a set top box or STB 404, a control access module (CAM) 406, a PPV headend server 408, and a content server 410. The method starts with a receive operation 411 where STB 404 receives a PPV content request from the user who operates STB 404. In aspects, while not shown, STB 404 may receive a predetermined PPV content programming schedule from the PPV headend server 408. STB 404 may provide the predetermined PPV content programming schedule to the user for selecting content. The predetermined PPV content programming schedule may include a list of content with date/time when the PPV headend server 408 broadcasts the content over the downlink channel of the satellite network. STB 404 may receive the PPV content request as the user interactively selects a PPV content on a display that is attached to STB 404. STB 404 may send a request 412 for PPV balance data to the CAM 406. In aspects, the CAM 406 is inserted in a card reader on STB 404. The CAM 406 sends (414) the PPV balance data to STB 404. In aspects, STB 404 reads the PPV balance data from the CAM 406. STB updates (416) the PPV balance data based on the pricing of the PPV content that is being requested.

The PPV headend server 408 commands the content server 410 to schedule (420) delivery of the PPV content based on a predetermined PPV content programming schedule. The commands to the content server 410 may instruct the content server 410 to transmit the PPV content through broadcasting over the downlink channels of the satellite communication. The content sever 410 then transmits (422) the PPV content to STB via the satellite communications network at dates and times that are specified by the predefined PPV content programming schedule STB 404 receives (430) a connection request from the mobile computing device 402 via NFC. STB 404 responds to the connection request by transmitting an acknowledgement (ACK) message to the mobile computing device 402 via NFC. The mobile computing device 402 sends a request (434) to STB 404 for PPV balance data. STB 404 requests (436) PPV balance data from the CAM 406. The CAM 406 sends (438) the PPV balance data to STB (404). STB (404) then sends (440) the PPV balance data to the mobile computing device 402 via NFC. The mobile computing device 402 may store the received PPV balance data locally in the memory of the mobile computing device 402. In some aspects, the mobile computing device 402 may send (442) a PPV command to the STB 404 to reset or update the PPV content sales transactions on the CAM 406. The mobile computing device 402 may send (442) the PPV command in response to the STB 404 sending (438) and the mobile computing device 402 receiving and locally storing the received PPV balance data. This way, there is no need for the mobile computing device 402 to re-connect with the STB 404 after communicating with the PPV headend server. Accordingly, the user has no need to wait for the PPV credit balance to be reset until after the user with the mobile computing device to return from the town. The user may purchase more PPV content without further wait based on the reset credit balance in the CAM 406 on the STB 404. In some other aspects, the PPV balance data on the CAM 406 may be updated when the mobile computing device 402 re-connects with the STB 404 after returning from the town. In aspects, the mobile computing device 402 may send (442) the PPV command and skip re-connecting with the STB 404 after communicating with the PPV headend server 408. (Steps 470, 472, and 474). In aspects, the mobile computing device 402 may be outside the service coverage area of a cellular communications network or the Wi-Fi hotspot while the mobile computing device 402 communicates with the STB 404.

The mobile computing device 402 transmits (450) a connection request to the PPV headend server 408. In aspects, the mobile computing device 402 moves its location after receiving the PPV balance data at the step 440 from outside the service coverage area of a cellular communications network to another location that is inside the service coverage area or within a Wi-Fi hotspot with the Internet connection. The mobile computing device 402 transmits (450) the connection request via the cellular/or Wi-Fi communications network through the Internet.

The PPV headend server 408 transmits (452) an acknowledgment message to the mobile computing device 402 via the Internet. The mobile computing device 402 receives the ACK message through the cellular/or Wi-Fi communications network. The mobile computing device transmits (454) the PPV balance data to the PPV headend server 408. The PPV headend server 408 then reconciles the customer account information. The PPV headend server transmits (456) a PPV command to the mobile computing device 402. In aspects, the PPV command instructs STB 404 to reset or update the PPV balance data, for example. The mobile computing device 402 stores the PPV command locally on the mobile computing device 402.

When the mobile computing device 402 is moved and is inside the coverage area of NFC in proximity to STB 404, the mobile computing device 402 transmits (470) a connection request to STB 404 via NFC. Upon receipt of the connection request, STB 404 sends (472) ACK data to the mobile computing device 402. The mobile computing device 402 then transmits (474) STB box 404 the PPV command. Upon receiving the PPV command, STB 404 resets or updates (475) the PPV balance data stored on the CAM. Accordingly, the CAM 406 resets or updates (476) the PPB balance data based on the PPV command. In aspects, the re-connecting operations of the mobile computing device 402 (operations 470, 472, 474, and 476) may be unnecessary. In particular, the mobile computing device may send (442) the PPV command to the STB 404 in response to receiving the balance data when the STB 404 sends (440) the balance data to the mobile computing deice 402.

As should be appreciated, operations 411-476 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 4B illustrates an example method of a cellular-communication-assisted PPV in accordance with aspects of the present disclosure. A general sequence of operations of the method 400B is shown in FIG. 4B. Generally, the method 400B starts with a receive operation 411 and ends with an update operation 480. The method 400B may include more or fewer steps or may arrange the order of the steps differently than those shown in FIG. 4B. In contract to the method 400A where the mobile communication device relaying the command from the PPV headend server to the CAM in STB, the method 400B provides the PPV headend server 408 communicating the STB 404 to update the PPV balance data. The method 400B can be executed as a set of computer-executable instructions executed by a computer system and encoded or stored on a computer readable medium. Further, the method 400B can be performed by gates or circuits associated with a processor, an ASIC, an FPGA, a SOC or other hardware device. Hereinafter, the method 400A shall be explained with reference to the systems, component, devices, modules, software, data structures, data characteristic representations, signaling diagrams, methods, etc. described in conjunction with FIGS. 1, 2, 3A-B, 4A, 5A-C, and 6.

FIG. 4B is a timing chart of communications among a mobile computing device 402, a set top box or STB 404, a CAM 406, a PPV headend server 408, and a content server 410. The method starts with a receive operation 411 where STB 404 receives a PPV content request from the user who operates STB 404. In aspects, while not shown, STB 404 may receive a predetermined PPV content programming schedule from the PPV headend server 408. STB 404 may provide the predetermined PPV content programming schedule to the user for selecting content. The predetermined PPV content programming schedule may include a list of content with date/time for the PPV headend server 408 to broadcast the content over the downlink channel of the satellite network. STB 404 may receive the PPV content request as the user interactively selects a PPV content on a display that is attached to STB 404. STB 404 may send a request 412 for PPV balance data to the CAM 406. In aspects, the CAM 406 is inserted in a card reader on STB 404. The CAM 406 sends (414) the PPV balance data to STB 404. In aspects, STB 404 reads the PPV balance data from the CAM 406. STB updates (416) the PPV balance data based on the pricing of the PPV content that is being requested.

The PPV headend server 408 schedules (420) a delivery of PPV content. Content Server 410 may transmit (422) the PPV content via the satellite downlink communications. STB 404 receives the PPV content and updates (424) the PPV viewing records or the PPV balance data in CAM 406.

The mobile computing device 402 may send (430) a connection request to the STB 404 via NFC. The STB 404 sends (432) an acknowledgement (ACK) of receiving the request to the mobile computing device 402. The mobile communication device 402 requests (434) the STB 404 the PPV balance data. The STB 404 requests (436) the CAM 406 the PPV balance data.

The CAM 406 sends (438) STB 404 the PPV balance data. At this time, the PPV balance data have not been reconciled with data in the PPV headend server 408. The STB 404 sends (440) the PPV balance data to the mobile computing device 402.

When the mobile computing device 402 is inside a service area of a cellular telecommunications network or has connectivity to the Internet via Wi-Fi, for example, the mobile computing device 402 transmits 450 a connection request to the PPV headend server 408. In return, the PPV headend server 408 transmits (452) an acknowledgement (ACK) of receiving the connection request. The mobile computing device 402 then transmits (454) the PPV balance data to the PPV headend server 408. After receiving the PPV balance data, the PPV headend server 408 transmits (456) an acknowledge (ACK) of receiving the PPV balance data.

The PPV headend server 408 then updates (not shown in the Figure) the balance data for the subscriber as specified by the CAM. The PPV headend server 408 transmits (480) the updated PPV balance data to the STB 404 via downlink channels of the satellite communications network. Upon receiving the updated PPV balance data, the STB 404 updates the updated balance data on CAM 406.

As should be appreciated, operations 411-482 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIGS. 5A-C illustrate exemplar data structures for PPV balance data in a cellular-communication-assisted PPV in an example system in accordance with aspects of the present disclosure. FIG. 5A illustrates an example PPV balance data as stored in the CAM. The PPV balance data 500A includes the current balance value 502A of 600 points. The current balance value 502A indicates the current PPV balance available for a future purchase of PPV content. The limit value 504A indicates the maximum number of points (1,000 points) that the customer may purchase PPV content. The last modified time 506A indicates a timestamp showing when the PPV balance data 500A was modified last time (at 7 am on Nov. 6, 2019, for example).

The PPV balance data 500A includes records of PPV content purchases. Purchase Date/Time 508A indicates a date/time when a PPV content was purchased. PPV Request ID 510A indicates an identifier for a requesting a PPV content. In aspects, the PPV Request ID is a unique number at the PPV headend server for managing PPV requests and content deliveries. Points 512A indicates a point that corresponds to the PPV content that was purchased. In some aspects, the points may correspond to a monetary value of the PPV content being paid for. Balance 513A indicates remaining balance information for the subscriber associated with the CAM. Set-top-Box ID 514A indicates an identifier of the STB that requested the PPV content. While not shown, there may be a status indicator that provides whether the requested PPV content was successfully received at the STB.

Accordingly, the PPV balance data 500A shows a purchase record of PPV content, for example: one occurred at 9 pm on Nov. 1, 2019, with a PPV Request ID of 0002019110120300005, a point deducted by 100 points on the STB 514A called "ABC." Similarly, the PPV balance data 500 includes four more PPV content requests. In aspects, STB sends the entire data in the PPV balance data 500A to the mobile computing device via NFC. The mobile computing device may then transmit the PPV balance data 500A to the PPV headend server when the mobile computing device becomes accessible to the Internet via the cellular/or Wi-Fi communications network. In aspects, the PPV headend server may update the PPV balance data 500A and transmits the updated PPV balance data to the CAM on the STB over a satellite broadcasting network or a satellite communications network.

FIG. 5B illustrates an example PPV balance data after the STB receives a PPV command from the mobile computing data via NFC. The PPV balance data 500B shows that the limit value 504B was changed to 1,500 points. The last modified time 506B shows noon on Nov. 6, 2019. The purchase record is empty. That is, the STB has reset the PPV balance data 500B and increased the limit value as instructed by the PPV command.

FIG. 5C illustrates an example PPV command in an example system in accordance with aspects of the present disclosure. The PPV command 500C shows a set of two commands. Each command includes, but not limited to, five parameters. Command ID 552 is an identifier of the command. Target Set-top Box ID 554 is an identifier of a target STB for executing the PPV command. Command 554 shows a PPV command for execution. Parameters 556 indicates one or more parameters for the PPV command. Accordingly, the first PPV command has Command ID 552 of 201911151205001, specifically targeted for execution at STB with its identifier "ABC," to "Update Balance" of the PPV balance data. The second PPV command indicates with an identifier 201911151205002 for a target STB of "ABC" to "Set Limit Value" to 1,500 points. In aspects, the result of performing the set of PPV commands is illustrated in the PPV balance data 500B in FIG. 5B.

As should be appreciated, the various methods, devices, applications, features, etc., described with respect to FIGS. 5A-C are not intended to limit the windows 500A-C to being performed by the particular applications and features described. Accordingly, additional controller configurations may be used to practice the methods and systems herein and/or features and applications described may be excluded without departing from the methods and systems disclosed herein.

FIG. 6 illustrates a simplified block diagram of a device with which aspects of the present disclosure may be practiced in accordance with aspects of the present disclosure. The device may be a set top box (STB) and a mobile computing device, for example. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to perform a cellular-communication-assisted PPV as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. In some aspects, the removable storage 608 includes a subscriber card (e.g., a smart card and a subscriber identification module (SIM) card). Similarly, the operating environment 600 may also have input device(s) 614 such as remote controller, keyboard, mouse, pen, voice input, on-board sensors, etc. and/or output device(s) 616 such as a display, speakers, printer, motors, etc. Also included in the environment may be one or more communication connections, 612, such as wireless LAN, WAN, a near-field communications network, a cellular broadband network, point to point, etc.

Operating environment of the present disclosure typically includes at least some form of computer readable media. Computer readable media can be any available media that can be accessed by processing unit or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a method of a cellular-assisted Pay-Per-view (PPV) using a mobile computing device. The method comprises receiving by the mobile computing device PPV balance data from a set top box (STB) with a CAM or a conditional access module (CAM) using a first network; the PPV balance data includes a purchase history of PPV content transmission from a PPV headend server to the STB over a second network; transmitting by the mobile computing device the PPV balance data using a third network; the first network, the second network, and the third network are distinct, the third network comprising an IP network; receiving, by the mobile computing device, a PPV command using the third network; and transmitting, by the mobile computing device, the PPV command using the first network. In an example, the PPV command instructs the STB to reset the PPV balance data on the CAM. In another example, one of the first network and the third network is operational based on a location of the mobile computing device. In another example, the PPV balance data comprises: an identifier of the STB; a PPV purchase history data; and a PPV balance value. In another example, a location of the STB is outside the service coverage area of the third network. In another example, the mobile computing device disconnects from the PPV headend server on the third network when receiving the PPV balance data from the STB on the first network; and the mobile computing device disconnects from the STB on the first network when transmitting the PPV balance data on the third network. In another example, the first network uses a near-field communication; the second network uses a satellite communication; the third network uses a cellular telecommunication with connection to the Internet; a communication from the STB to the PPV headend server over the second network being unavailable; and a location of the STB being outside the service coverage area of the third network. In another example, the method further comprises storing the received PPV balance data on the mobile computing device; and storing the received PPV command on the mobile computing device. In another example, the mobile computing device is disconnected from the first network for communication with the STB when communicating over the third network.

In another aspect, the technology relates to a method of a cellular-assisted Pay-Per-View (PPV) using a mobile computing device. The method comprises receiving by the mobile computing device PPV balance data from a set top box (STB) with a CAM using a first network, wherein the PPV balance data includes at least one of a purchase data of PPV content at the STB or a purchase history of PPV content broadcast from a PPV headend server to the STB over a second network; transmitting by the mobile computing device the PPV command using the first network; and transmitting by the mobile computing device the PPV balance data using a third network, wherein the first network, the second network, and the third network are distinct, the third network comprising an IP network. In an example, the PPV command instructs the STB to reset the PPV balance data on the CAM. In another example, one of the first network or the third network is operational for the mobile computing device based on a location of the mobile computing device. In another example, the PPV balance data comprises a timestamp of the PPV content transaction, an identifier of the STB, and an identifier of the PPV content. In another example, the first network uses a near-field communication; the second network uses a satellite communication; the third network using a cellular telecommunication with connection to the Internet; a communication from the STB to the PPV headend server over the second network being unavailable, and a location of the STB being outside the service coverage area of the third network.

In another aspect, the technology relates to a system of a cellular-assisted Pay-Per-View (PPV) using a mobile computing device. The system comprises a processor; and a memory storing computer-executable instructions that when executed cause the processor to: receive, by a PPV headend server using a first network, the PPV balance data from a mobile computing device, wherein the PPV balance data relates to the mobile computing device previously receiving the PPV balance data over a second network from a set top box (STB) with a conditional access module (CAM), and wherein the PPV balance data include at least one of a purchase data of PPV content received from a PPV headend server to the STB over a third network; updating, by the PPV headend server, the PPV balance data; and transmit, by the PPV headend server, the updated PPV balance data to the STB using the third network, wherein the update PPV balance data causes the STB to update the CAM on the STB, and wherein the first network, the second network, and the third network are distinct. In example, the updated PPV balance data includes an instruction for the STB to reset the PPV balance data on the CAM, and wherein one of the first network or the second network is operational for the mobile computing device based on a location of the mobile computing device. In another example, the PPV balance data comprises: a timestamp of the PPV content transaction, an identifier of the CAM, PPV balance information of the CAM, and an identifier of the PPV content. In another example, the first network comprises connection over a cellular communication channel or a Wi-Fi communication channel, the second network comprises a near-field communication (NFC) channel, and the third network comprises a satellite communication channel. In another example, the mobile computing device is disconnected from the second network for communication with the STB while the mobile computing device communicating with the PPV headend server over the first network.

Any of the one or more above aspects in combination with any other of the one or more aspect. Any of the one or more aspects as described herein.

What is claimed is:

1. A method of a cellular-assisted Pay-Per-View (PPV) using a mobile computing device, the method comprising:
    receiving, by the mobile computing device, PPV balance data from a set top box (STB) with a conditional access module (CAM) using a first network, wherein the PPV balance data includes a purchase history of PPV content transmission from a PPV headend server to the STB over a second network, wherein the STB is not connected to a third network, wherein the third network connects with the PPV headend server, and wherein the first network, the second network, and the third network are distinct networks;
    transmitting, by the mobile computing device, the PPV balance data to the PPV headend server using the third network;
    receiving, by the mobile computing device, a PPV command using the third network;
    after receiving the PPV command by the mobile computing device, determining that the mobile computing device is in proximity of the STB;
    when the mobile computing device is in proximity of the STB, connecting to the STB via the first network and transmitting, by the mobile computing device, the received PPV command to the STB using the first network; and
    causing the STB to execute the PPV command received from the mobile computing device.

2. The method of claim 1, wherein the PPV command instructs the STB to reset the PPV balance data on the CAM.

3. The method of claim 1, wherein one of the first network and the third network is operational based on a location of the mobile computing device.

4. The method of claim 1, wherein the PPV balance data comprises:
    a timestamp of the PPV content transaction;
    an identifier of the STB or CAM; and
    an identifier of the PPV content.

5. The method of claim 1, wherein a location of the STB is outside the service coverage area of the third network.

6. The method of claim 1, wherein the mobile computing device is not connected to the PPV headend server on the third network upon receiving the PPV balance data from the STB on the first network, and wherein the mobile computing device is not connected to the STB on the first network when transmitting the PPV balance data on the third network.

7. The method of claim 1, the first network using a near-field communication, the second network using a satellite communication, the third network using a cellular telecommunication or a Wi-Fi network with connection to the Internet, a communication from the STB to the PPV headend server over the second network being unavailable, and a location of the STB being outside the service coverage area of the third network.

8. The method of claim 1, further comprising:
    storing the received PPV balance data on the mobile computing device; and
    storing the received PPV command on the mobile computing device.

9. The method of claim 1, wherein the mobile computing device is disconnected from the first network for communication with the STB while the mobile computing device communicating with the PPV headend server over the third network.

10. The method of claim 1, wherein the PPV command instructs the STB to update the PPV balance data on the CAM.

11. A method of a cellular-assisted Pay-Per-View (PPV) using a mobile computing device, the method comprising:
    receiving, by the mobile computing device, PPV balance data from a set top box (STB) with a conditional access module (CAM) using a first network, wherein the PPV balance data includes at least one of a purchase data of PPV content at the STB or a purchase history of PPV content broadcast from a PPV headend server to the STB over a second network, wherein the STB is not connected to a third network, wherein the third network connects with the PPV headend server, and wherein the first network, the second network, and the third network are distinct networks;
    transmitting, by the mobile computing device, a PPV command using the first network to the STB upon determining that the mobile computing device is in proximity of the STB;
    causing the STB to execute the PPV command in response to the STB receiving the PPV command via the first network;
    after transmitting the PPV command, transmitting, by the mobile computing device, the PPV balance data using the third network; and causing the PPV headend server to update account information associated with the PPV balance data in response to receiving the PPV balance data via the third network.

12. The method of claim 11, wherein the PPV command instructs the STB to reset the PPV balance data on the CAM.

13. The method of claim 11, wherein one of the first network or the third network is operational for the mobile computing device based on a location of the mobile computing device.

14. The method of claim 11, wherein the PPV balance data comprises:
a timestamp of the PPV content transaction;
an identifier of the STB of CAM; and
an identifier of the PPV content.

15. The method of claim 11, wherein the first network comprises a near-field communication channel, the second network comprises a satellite communication channel, and the third network comprises a cellular communication channel or a Wi-Fi communication channel.

16. A system of a cellular-assisted Pay-Per-View (PPV), the system comprising:
a processor; and
a memory storing computer-executable instructions that when executed cause the processor to:
receive, by a PPV headend server using a first network, PPV balance data from a mobile computing device, wherein the PPV balance data relates to the mobile computing device previously receiving the PPV balance data over a second network from a set top box (STB) with a conditional access module (CAM) when the mobile computing device is in proximity of the STB, and wherein the PPV balance data include a purchase data of PPV content previously transmitted by a PPV headend server to the STB over a third network, wherein the STB is not connected to the first network, and wherein the first network, the second network, and the third network are distinct networks;
updating, by the PPV headend server, the PPV balance data;
transmit, by the PPV headend server, the updated PPV balance data to the STB using the third network; and
causing the STB to update the conditional access module (CAM) on the STB, after the STB executing a PPV command received from the mobile computing device using the second network when the mobile computing device is in proximity of the STB.

17. The system of claim 16, wherein the updated PPV balance data includes an instruction for the STB to reset the PPV balance data on the CAM, and wherein one of the first network or the second network is operational for the mobile computing device based on a location of the mobile computing device.

18. The system of claim 17, wherein the PPV balance data comprises:
a timestamp of the PPV content transaction;
an identifier of the STB or CAM; and
an identifier of the PPV content.

19. The system of claim 17, wherein the first network comprises connection over a cellular communication channel or a Wi-Fi communication channel, the second network comprises a near-field communication (NFC) channel, and the third network comprises a satellite communication channel.

20. The system of claim 17, wherein the mobile computing device is disconnected from the second network for communication with the STB while the mobile computing device communicating with the PPV headend server over the first network.

* * * * *